UNITED STATES PATENT OFFICE.

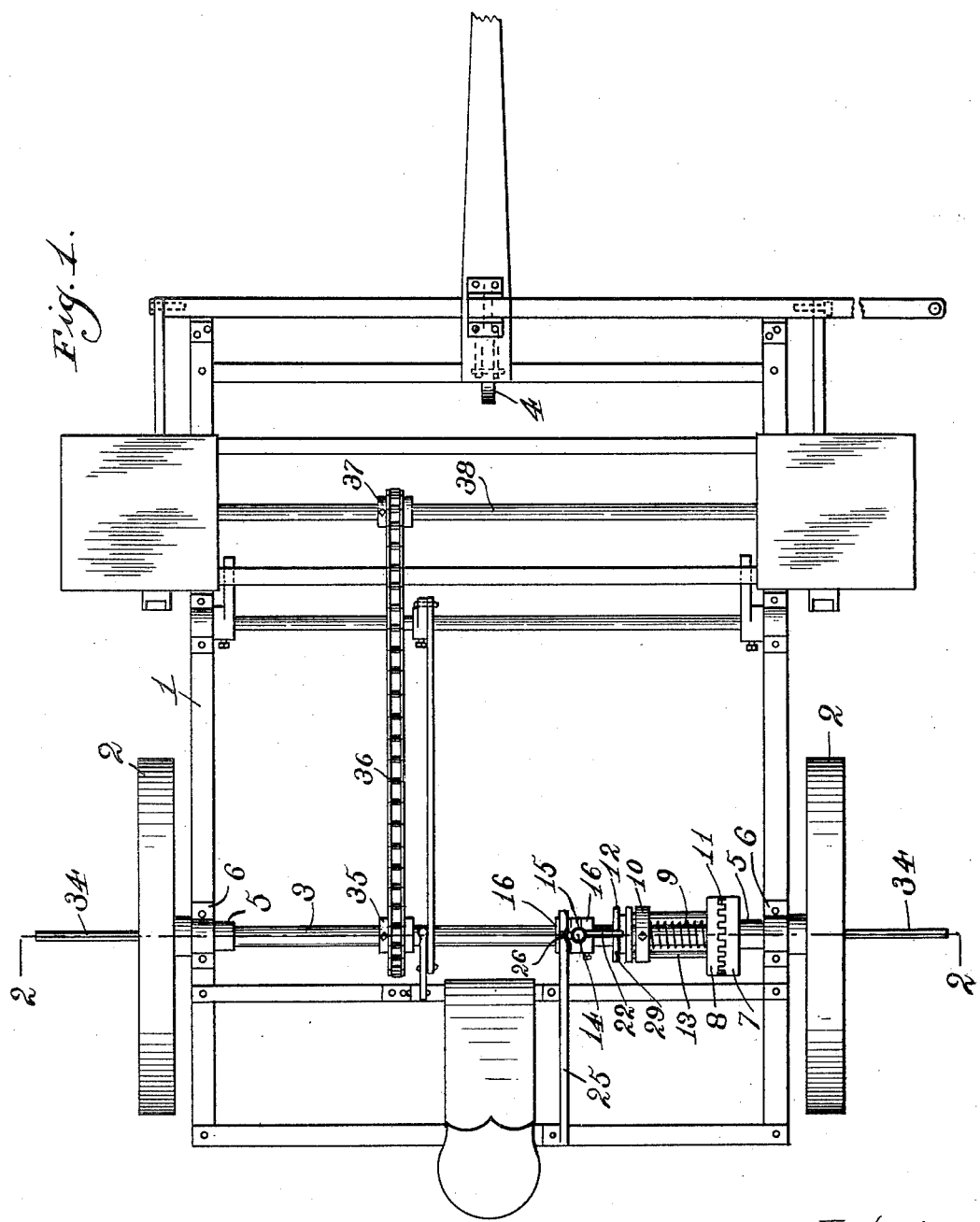

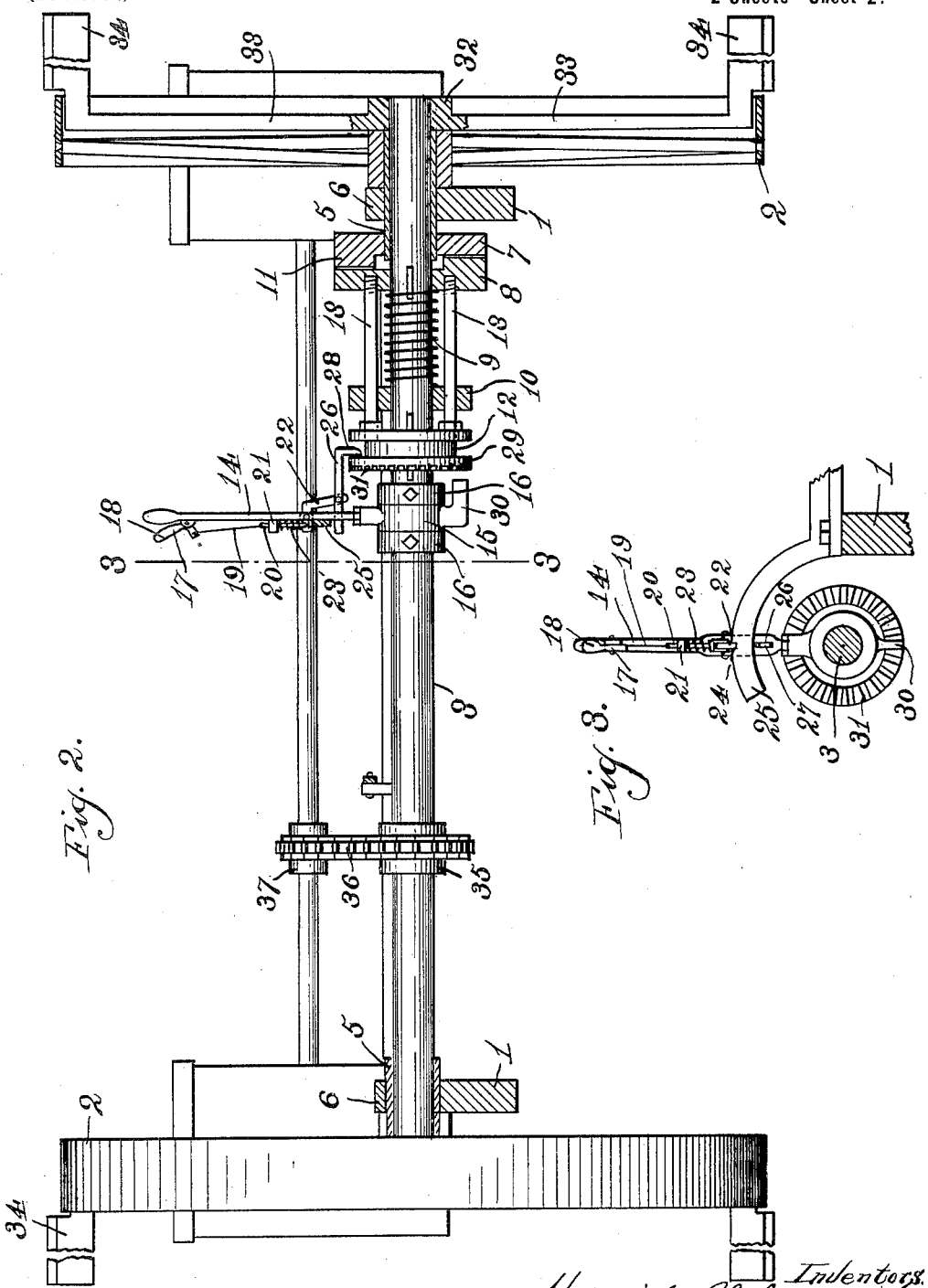

HEINRICH ALTHAUS AND ANTON HESSELMANN, OF DYERSVILLE, IOWA.

CORN-PLANTER.

SPECIFICATION forming part of Letters Patent No. 667,900, dated February 12, 1901.

Application filed September 25, 1900. Serial No. 31,009. (No model.)

*To all whom it may concern:*

Be it known that we, HEINRICH ALTHAUS and ANTON HESSELMANN, citizens of the United States, residing at Dyersville, in the county of Dubuque and State of Iowa, have invented certain new and useful Improvements in Corn-Planters; and we do hereby declare the following to be a full, clear, and exact description of the invention, such as will enable others skilled in the art to which it appertains to make and use the same.

Our invention relates to an improvement in corn-planters, the object being to provide a corn-planter in which the checking devices can readily be adjusted to match the planted hills; and it consists in the features of construction and combinations of parts hereinafter fully described and claimed.

In the accompanying drawings, illustrating our invention, Figure 1 is a top plan view of a corn-planter made in accordance with our invention. Fig. 2 is a cross-section on line 2 2 of Fig. 1. Fig. 3 is a detail section on line 3 3 of Fig. 2.

In using corn-planters it has been difficult to readily set the dropping and marking devices to register or correspond with the hills already planted. To facilitate this operation and make it convenient for the driver to set the dropping and marking devices without bringing the machine to a standstill, we have devised this improved planter.

In said drawings, 1 represents a suitable frame adapted to carry the various parts of the corn-planter. Said frame 1 is supported at a proper height on the wide-rimmed wheels 2, which are revolubly mounted on the axle 3 near the rear end of said frame 1, and the caster-wheel 4, which is placed under the middle portion of the forward end of said frame 1. Said wheels 2 are rigidly mounted on the outer ends of sleeves 5, which surround said axle 3 and are revolubly mounted in suitable bearings 6 on the said bars of said frame 1. A clutch member 7 is rigidly mounted on the inner end of one of said sleeves 5 and is adapted normally to be engaged with a clutch member 8, which is slidingly mounted on said axle 3. Said clutch members 7 and 8 are normally held in engagement by means of the compression-spring 9, which surrounds said axle 3 and is adapted at one end to bear against said clutch member 8 and at the other end to bear against the collar 10, which is rigidly secured to said axle 3. Said clutch members 7 and 8 are provided on their opposing faces with a plurality of intermeshing radial projections or teeth 11, adapting said clutch members to be engaged in many positions. Adjacent to said collar 10 the sleeve 12 is slidingly mounted on said axle 3 and is rigidly connected with said clutch member 8 by means of the rods 13, which have their ends rigidly secured in said sleeve and in said clutch member 8 and pass freely through said collar 10. Said sleeve 12 is adapted to be moved along said axle to separate said clutch member 8 from said member 7 in order that said axle may be free to be revolved independently of the revolution of said wheels 2. Said sleeve 12 is moved endwise by means of a radial hand-lever 14, which is rigidly mounted on a collar 15, which is revolubly mounted on said axle 3 between the fixed collars 16 and carries near its outer end the bell-crank lever 17, pivotally secured thereto, provided with a handpiece 18, adapted to be grasped when the handle of said lever 14 is grasped. The free end of said lever 17 is connected by a wire 19 with the upper end of a connecting-rod 20, which is slidingly mounted on said lever 14, its upper end being guided by passing through an opening in the lug 21, which is rigidly mounted on said lever 14. The lower end of said rod 20 is pivotally connected to the short end of a second bell-crank lever 22, which is pivotally mounted on said lever 14 near its base. A compression-spring 23, which surrounds said rod 20, is adapted to normally hold said rod 20 at the lower limit of its motion and force the short end of said bell-crank lever 22 into a notch 24 in a rigid member or bracket 25, which is mounted on said frame 1 adjacent said lever 14, thus holding said lever 14 normally locked in an upright position. The long end of said second bell-crank lever 22 is pivotally secured to a sliding bar 26, which is designed to move lengthwise with said axle 3, being guided by passing through a slot 27 in the base of said lever 14 and being provided on its free end with a hook 28, which is adapted to engage a flange 29 on said sleeve 12 and when said bell-crank levers are operated to pull said sleeve 12 along said axle and disengage said clutch members 7 and 8. Said collar 15 is provided on the side opposite said hand-lever 14 with a projection 30, which projects toward the flange 29 of said sleeve 12 and is adapted to engage with radial teeth 31 on the adjacent surface of said flange 29, thus locking said sleeve 12 with said hand-lever 14 after said clutch members 7 and 8 have been separated. When said lever 14 and handpiece 18 of bell-crank lever 17 are grasped, the short end of said bell-crank lever 22 is withdrawn from said notch 24, thus unlocking said lever 14 and leaving it free to be moved back and forth. Also said clutch members 7 and 8 are disengaged and said projection 30 on collar 15 is engaged with the teeth on said flange 29 of said sleeve 12, thus locking said lever 14 with said sleeve 12, thereby making it possible to rotate said axle 3 in relation to said wheels 2 by means of said lever 14. Each end of said axle 3 carries a hub 32 rigidly mounted thereon, which is provided with two diametrically opposite radial arms 33, which are designed to carry check-row markers or blades 34, securely fastened to their outer ends. Said markers 34 project longitudinally with the shaft and radially beyond the rims of said wheels 2, so that as said planter advances over the ground said markers 34 will make impressions in the ground at regular intervals. The length of the said markers 34 is such that the distance from the center of the rim of the adjacent wheel to the end of the marker is more than half the distance between the rows of corn, so that as the planter is used back and forth across the field the impressions made by the markers 34 will overlap. The said dropping mechanism is operated from said axle 3 by means of the sprocket-wheel 35, rigidly mounted on said axle, and the chain 36, which transmits motion to the wheel 37, mounted on the shaft 38 of the seeding mechanism. As the said dropping mechanism does not form an essential part of our invention, the description of same is omitted.

In operating said planter, should the check-row markers 34 not register with the marks made by same on the previous trip and which indicate where the corn is planted, the operator adjusts said markers circumferentially in relation to the rims of said wheels 2 by operating said lever 14 and bell-crank lever 17, and thus rotating said axle 3 and markers 34 in relation to said wheels 2, and when the right relative position is reached said handpiece of said bell-crank lever 17 is released, the spring 9 operating to disengage said lever 14 and sleeve 12 and to engage the clutch members 7 and 8, and thus lock said members in relation to said wheels 2. Said lever 14 is then brought to an upright position and the short end of said bell-crank lever 22 is forced into said notch 24, thus firmly holding said lever 14 in its normal position.

It is obvious that if the planter is in motion the check-row markers 34 may be adjusted in relation to said wheels 2 by operating only said bell-crank lever 17, and thus through the mechanism attached thereto holding said axle 3 stationary while the wheels advance to the proper relative position.

We claim as our invention—

In a machine of the kind specified, check-row markers carried by the drive-axle of the machine, a clutch adapted normally to hold said axle rotatively locked with one of the drive-wheels of said planter, means for disengaging said clutch and rotating said axle in relation to said drive-wheel, comprising a lever rotatively mounted on said axle, a bell-crank lever carried by said lever adapted to be grasped by the hand connected with a second bell-crank lever carried near the base of said lever, a hook pivotally mounted on the free end of said second bell-crank lever adapted to engage a flange slidingly mounted on said axle and rigidly connected with one of said clutch members adapted when said first-said clutch members adapted when said first-mentioned bell-crank lever is operated to pull said flange along said axle and disengage said clutch, means for locking said first-mentioned lever with said flange, comprising a projection rigid with said first-mentioned lever adapted to engage teeth on the lateral surface of said flange opposite the surface which said hook is adapted to engage, and means for holding said first-mentioned lever in a definite normal position when said lever is not being operated.

In testimony whereof we affix our signatures in presence of two witnesses.

HEINRICH ALTHAUS.
ANTON HESSELMANN.

Witnesses:
HENRY F. KREMER,
B. J. SCHEMMEL.